Aug. 19, 1969   C. D. RUSSELL   3,462,647
CDR SELF-ACTUATING VOLTAGE LEVEL PROTECTIVE CIRCUIT
FOR VEHICULAR ELECTRICAL SYSTEMS
Filed March 21, 1967
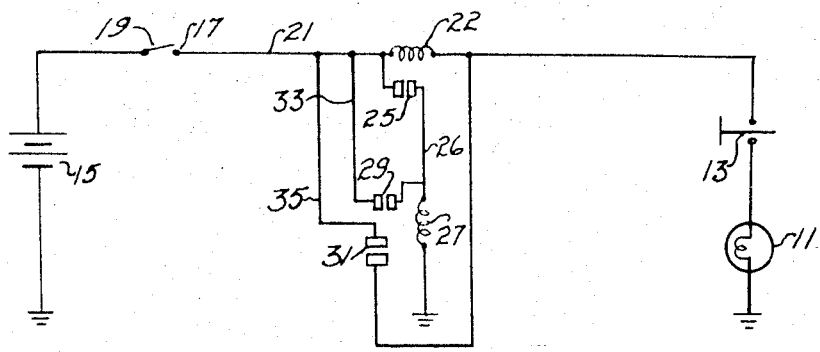
INVENTOR
Carl D Russell United States Patent Office 3,462,647
Patented Aug. 19, 1969

3,462,647
CDR SELF-ACTUATING VOLTAGE LEVEL PROTECTIVE CIRCUIT FOR VEHICULAR ELECTRICAL SYSTEMS
Carl D. Russell, Muskogee, Okla.
(1502 S. Boulder Ave., 22G, Tulsa, Okla. 74119)
Filed Mar. 21, 1967, Ser. No. 624,834
Int. Cl. H02h 3/28
U.S. Cl. 317—31                      7 Claims

ABSTRACT OF THE DISCLOSURE

The invention comprises a circuit and apparatus for disconnecting a source of electrical potential, such as a vehicle battery, from its load circuit when its output voltage drops to a predetermined level. The level is set to conserve sufficient energy in the battery for starting of the vehicle. A circuit is provided, preferably from the ignition switch off position, to the vehicle accessories (load) operable without the ignition key, such as the lights, which may be inadvertently left on. An initiating circuit energizes a sensing circuit in response to any load drain. The sensing circuit then energizes a sensing holding circuit for itself. The sensing holding circuit closes a load-carrying circuit until the battery voltage reaches the predetermined level, at which time, the sensing holding circuit opens the load-carrying circuit which cannot be reestablished until the battery voltage rises above the predetermined level.

---

The circuit of the invention is adapted to be connected between the battery and accessory loads when the ignition switch is in the off position, thereby safeguarding the battery from any device inadvertently left on.

The invention is an improvement over my earlier filed applications entitled CDR Self-Actuating Voltage Level Outlet Control filed Feb. 16, 1967 as Ser. No. 621,721 and CDR Voltage Level Control filed Feb. 16, 1967 as Ser. No. 616,638.

One feature of the invention resides in the fact that the circuit does not come into operation, until and unless, some accessory is turned on. For example, an operator may turn the ignition off and then turn lights or radio on for one reason or another, thereafter leaving the vehicle with the keys, and any such accessories may drain the battery completely so that the car cannot be started without resort to assistance. The purpose of the invention is to maintain sufficient energy in the battery regardless of such inadvertent acts so that the vehicle may be self-starting when the operator returns.

Thus, the initiating circuit is provided to set into action the present protecting circuit whenever the ignition key is in the off position and a load drain is under way, even including short circuits and the like. The sensing circuit is provided and is rendered operable when the initiating circuit detects a load current. This is achieved by a switch-actuating means included in the initiating circuit to close switch means in the sensing circuit. The sensing holding circuit is rendered operative by switch-actuating means in the sensing circuit, through operation of switch means in the holding circuit to maintain the sensing holding circuit operative insuring closing of the load carrying circuit which shorts the initiating switch actuating means without any further current drain through the initiating circuit, so long as the load carrying circuit is effective and the voltage sensed is above the predetermined level.

When the sensing circuit is activated, and if the voltage level is above the predetermined level, the sensing circuit through its switch-actuating means (common to both the sensing and sensing holding circuits) closes the switch means in the load-carrying circuit to maintain full load current to the device inadvertently left on. This is a very important feature of the invention because it assures operation of the lights, for example, even though the ignition key has been turned off, provided the battery is above the predetermined level. Thus, emergency and other situations may be met.

However, since the load carrying circuit is under control of the sensing and/or sensing holding circuit, whenever the drain on the battery is such as to reduce its output to the predetermined level, the sensing circuit actuating means is no longer sufficiently strong to maintain the load carrying circuit closed, and the latter opens automatically to cut off the accessory and conserve the battery energy, then permitting only trickle current flow through the initiating circuit.

Even if the above condition persists and the battery rejuvenates itself, it will again automatically be disconnected through the same action and this process will continue until the operator returns and rectifies the problem or the battery fails to rejuvenate itself above the predetermined voltage level. In any event, there will remain sufficient energy in the battery to start the vehicle without outside assistance.

A suitable sensing element for the sensing circuit, in the form of the switch-actuating means, may comprise an electromagnet provided with armatures spaced from both ends of its coil by springs, as disclosed in both of my aforementioned applications. The springs are carried by a common nonmagnetic core shaft. One of the armatures includes a pair of contacts which is closed so long as the coil is sufficiently energized because the contacts are drawn with the armature toward one end of the coil to strike a metal conductor cap on one end of the core shaft which bridges the contacts. The cap is also carried toward the contacts because the other armature is being drawn toward its end of the coil, which pushes the shaft upwardly or in the direction of the contacts, thus forwarding the contacts and cap together. However, any other suitable relay or solenoid which fails to activate its contacts at the predetermined voltage will work.

Thus, so long as the battery voltage is above a predetermined energy level, usually 9 volts or a predetermined current rating, the sensing coil or switch actuating means has sufficient strength to maintain the load carrying contacts closed. However, when the energy drain from the battery has reached the predetermined level, the strength of the coil is insufficient to maintain the contacts closed, and thus they are opened automatically to interrupt the battery circuit.

Various types of conventional or unconventional components may serve as the switch actuating means and contacts, as is particularly set forth in said prior applications.

With the foregoing in mind, it will now be appreciated that among the objects of the invention is the provision of a simple and inexpensive protective circuit which is rendered operative when the ignition switch is off.

It is a further object of the invention to provide such a system which is effective whether or not the accessory is inadvertently left on before the ignition switch is turned to off position or is turned on after the ignition switch is turned to its off position.

It is also important as an object of this invention to provide zero current drain through the use of this system when there is no accessory or load current flowing, while maintaining the protection.

Another object of the invention is to provide a circuit which requires only a small current drain, even when the ignition switch is off and an accessory is inadvertently left on, to enable the protective action.

Referring now to the figure, an accessory load is indicated by, for example, the vehicle lights 11 connected between ground and the light actuating switch 13. The vehicle battery 15 is connected to input contact terminal 17 by way of a lock or ignition switch 19, when the latter would normally be in its off position; the operating components of the circuitry being disposed between input terminal 17 and light switch 13.

An initiating circuit includes switch actuating means 22 in lead 21 to detect the presence of current from any load accessory (the other accessories not shown being in parallel with lights 11) when the circuit of this invention is operative with switch 19 closed on contact 17. Thus currents in accessories inadvertently left on, or even shorts in such accessories, will be detected by the device 22 which may comprise an ordinary solenoid or coil characterized by high impedance to minimize the current drain through the coil 22. The coil 22 upon energization closes its switch means or contacts 25 to energize sensing means 27 which is also a switch actuating means and may comprise a relay or solenoid coil or the coil of my aforementioned applications. This coil is preferably characterized by high impedance to minimize current loss through it.

Energization of coil 27 serves to close its holding contacts 29 and the large low impedance load carrying contacts 31. The reason for the holding circuit comprising contacts 29 and lead 33 is to maintain the coil 27 energized when the load carrying contacts 31 in lead 35 short-out the initiating coil 22 such that its contacts 25 open.

Thus, it will be appreciated that if an undesired current is sensed, the load is carried by a low impedance load path so that the protective circuit utilizes very little energy. On the other hand, if no undesired currents are detected by initiating coil 22, the protective circuit uses no power from battery 15, even though switch 19 is closed.

Once the protective circuit is brought into play, it remains with sensing means 27 energized and load carrying contacts 31 closed until the voltage from the battery 15 drops to the predetermined level, at which time the energy of coil 27 is insufficient to maintain its contacts closed and so load carrying contacts 31 and holding contacts 29 are opened automatically; thus, restoring the protective circuit to its initial condition except that now initiating coil 22, although maintainng contacts 25 in lead 26 closed, does not energize sensing coil 27. Thus, only the trickle current flows through coil 22 until such time as the battery may rejuvenate itself to a voltage above the predetermined level whereupon the aforedescribed sequence is repeated thereby serving to maintain the energy level of the battery sufficient for restarting of the vehicle.

While the preferred form of the invention has been illustrated and described, it may well be that the same is susceptible to other embodiments within the principles taught herein.

What is claimed is:

1. A system for disconnecting the voltage supply from a vehicular battery to a vehicular load at a predetermined voltage or current level comprising, in combination sensing means for determining when the voltage decreases below the predetermined level; a holding circuit for maintaining the sensing means in operative condition; an initiating circuit responsive to load drain from the battery to energize said sensing means thereby to render the holding circuit operative; and a load-carrying circuit connected between the battery and the load by said sensing means when energized and interruptible by said sensing means when the battery voltage diminishes below said predetermined lev-l.

2. The system of claim 1 wherein said initiating circuit and said sensing means are characterized by high impedance; and said load-carrying circuit is characterized only by low impedance.

3. The system of claim 1 wherein said initiating circuit comprises a coil connected between the battery and the load and a conductor with a pair of contacts connected from the battery to the sensing means whereby energization of said coil closes said contacts to energize said sensing means if the battery voltage exceeds said predetermined level.

4. The system of claim 1 wherein said holding circuit comprises a conductor and a pair of contacts connected from the battery to the sensing means; and said sensing means comprises a sensing coil effective to close said contacts upon energization of the sensing coil.

5. The system of claim 1 wherein said sensing means comprises a sensing coil; and said load carrying circuit comprises a conductor and a pair of contacts connected between the battery and the load in which said contacts are closed by said sensing coil upon energization of the sensing coil.

6. The system of claim 1 wherein said sensing means comprises a sensing coil; and said initiating circuit comprises a high impedance coil connected between the battery and the load; a pair of conductors each comprising a set of contacts in series connected between the battery and the sensing coil of the sensing means; one of said sets of contacts being responsive to energization of the high impedance coil of the initiating circuit to close and energize said sensing means if the battery voltage is above said predetermined level; and the other of said sets of contacts is responsive to energization of the sensing coil of the sensing means to close and provide said holding circuit.

7. A system for disconnecting the voltage supply from a vehicular battery to a vehicular load at a predetermined energy level comprising, in combination, a sensing circuit comprising magnetic flux producing means adapted to be connected to sense the battery voltage for determining when the voltage decreases below the predetermined level; a holding circuit comprising a conductor and a set of contacts connected between the battery and the flux means with the contacts being closed upon energization of the flux means for maintaining the sensing circuit in sensing condition while the holding circuit is operative; an initiating circuit comprising a coil and a further set of contacts responsive to any load drain from the battery; said initiating circuit comprising a lead including said further contacts connected between the battery and said flux means to render said flux means operative if the voltage is above said predetermined value; and a load-carrying circuit comprising a lead and a set of load contacts connected between the battery and the load and operable by said flux means when energized by closing said load contacts and interruptible by said flux means when the battery energy diminishes below said predetermined level by opening said load contacts.

References Cited

UNITED STATES PATENTS

| 1,938,828 | 12/1933 | Gordon | 307—10 X |
| 2,051,514 | 8/1936 | Block | 320—40 |
| 3,376,467 | 4/1968 | Ree | 315—82 |

JOHN F. COUCH, Primary Examiner

J. D. TRAMMELL, Assistant Examiner

U.S. Cl. X.R.

307—10; 315—82; 320—33, 40